May 19, 1942.　　H. W. ZIMMERMAN　　2,283,888
TORQUE MEASURING WRENCH
Filed Nov. 22, 1937　　6 Sheets-Sheet 1
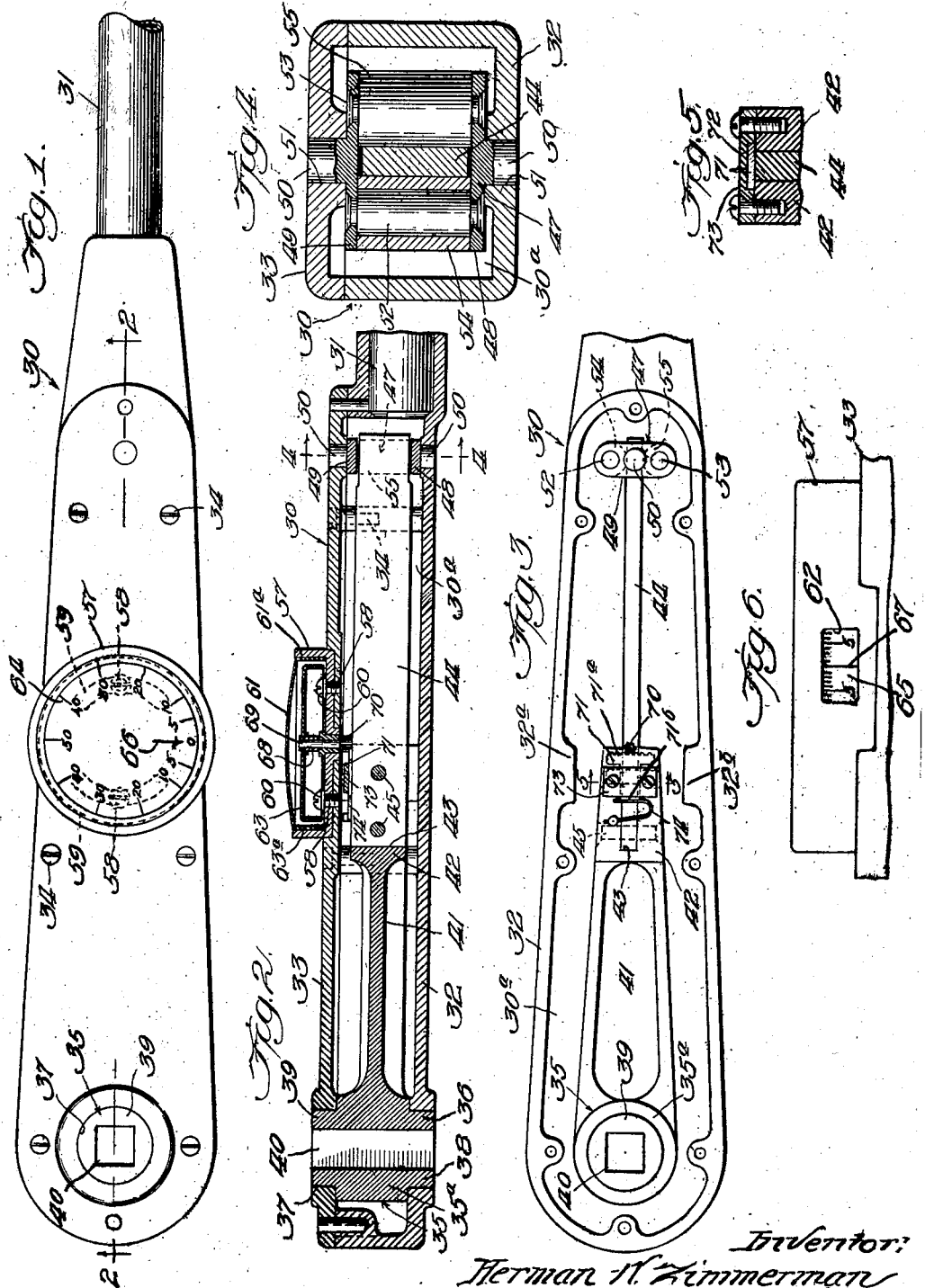

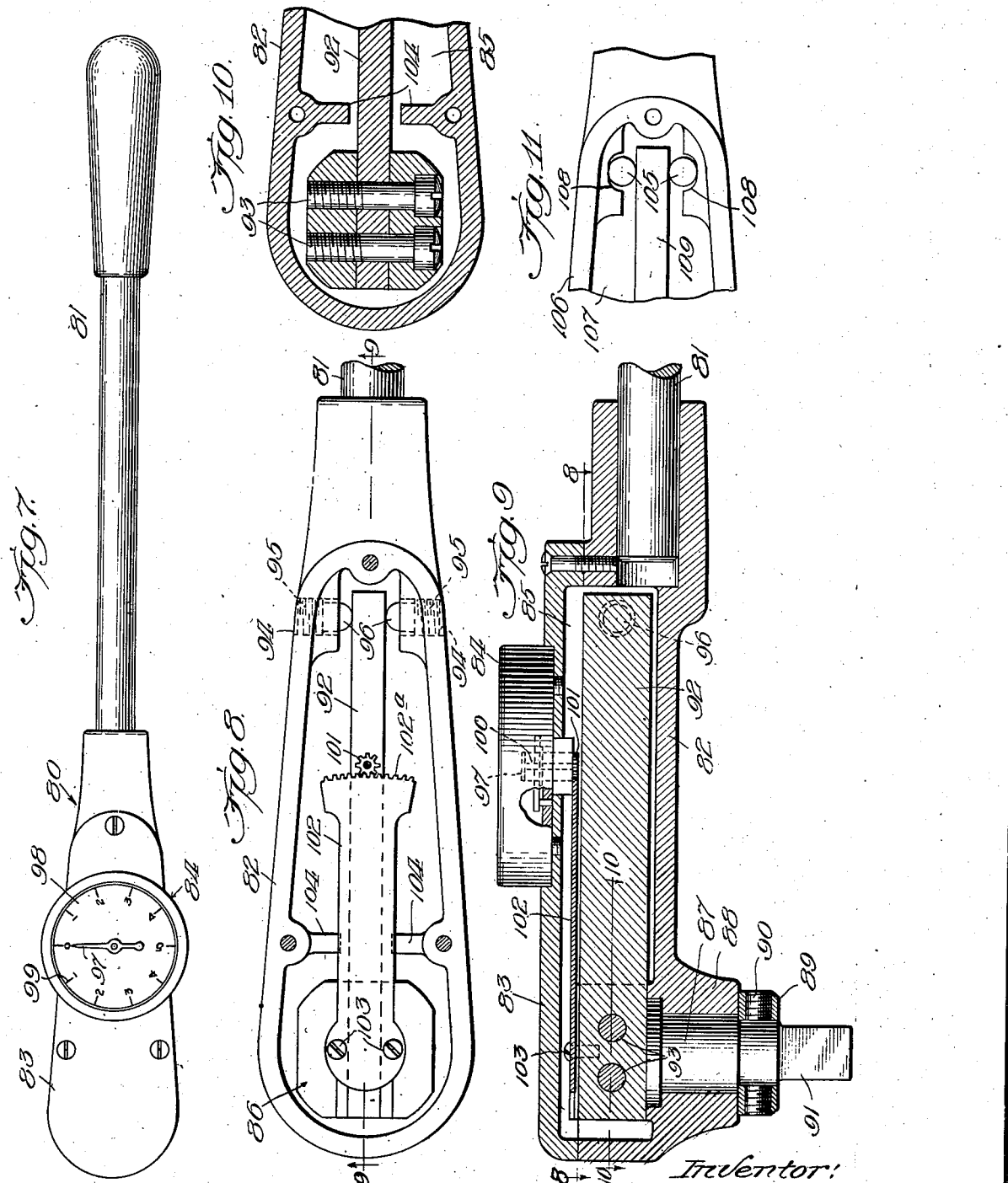

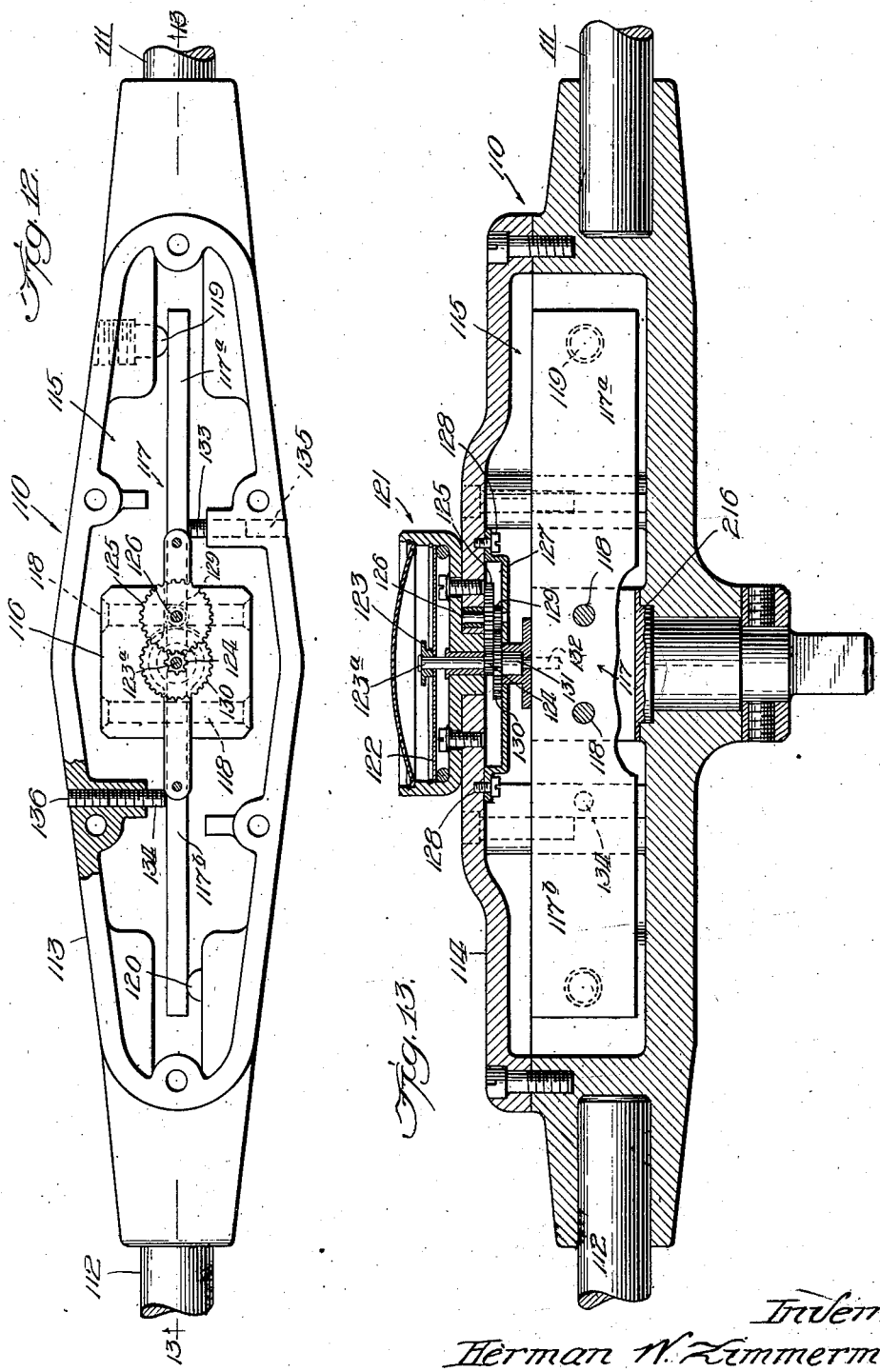

May 19, 1942.  H. W. ZIMMERMAN  2,283,888
TORQUE MEASURING WRENCH
Filed Nov. 22, 1937   6 Sheets-Sheet 4
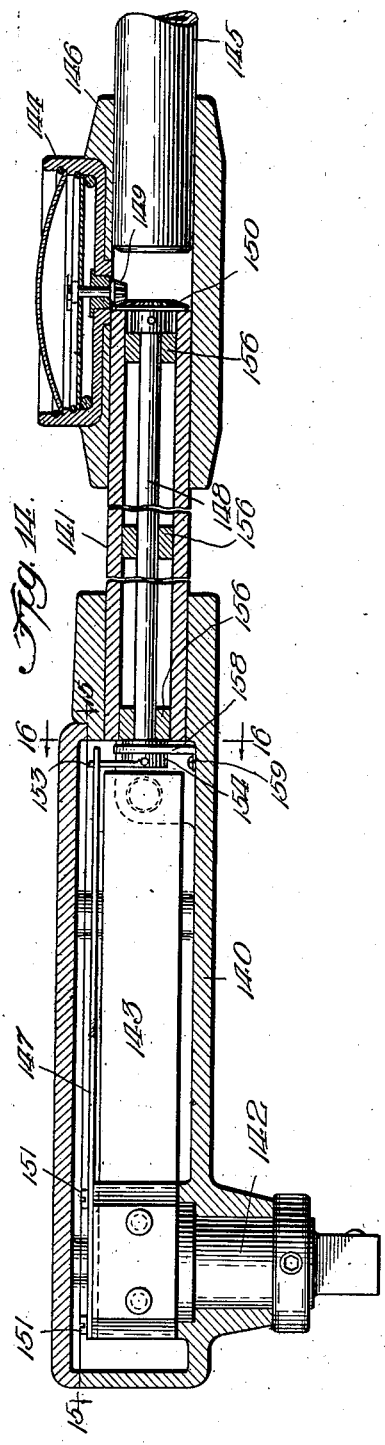
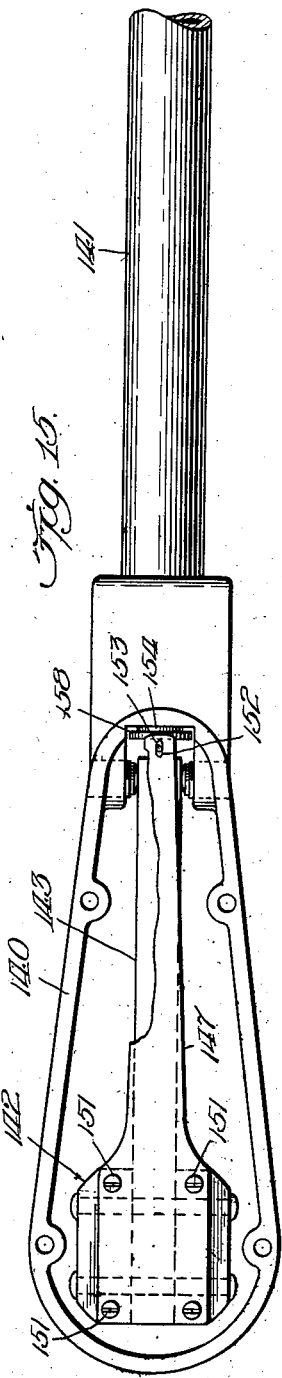
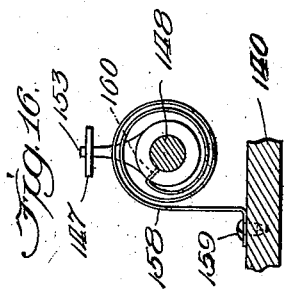
Inventor:
Herman W. Zimmerman
by Davis, Lindsey, Smith & Shonts
Attys.

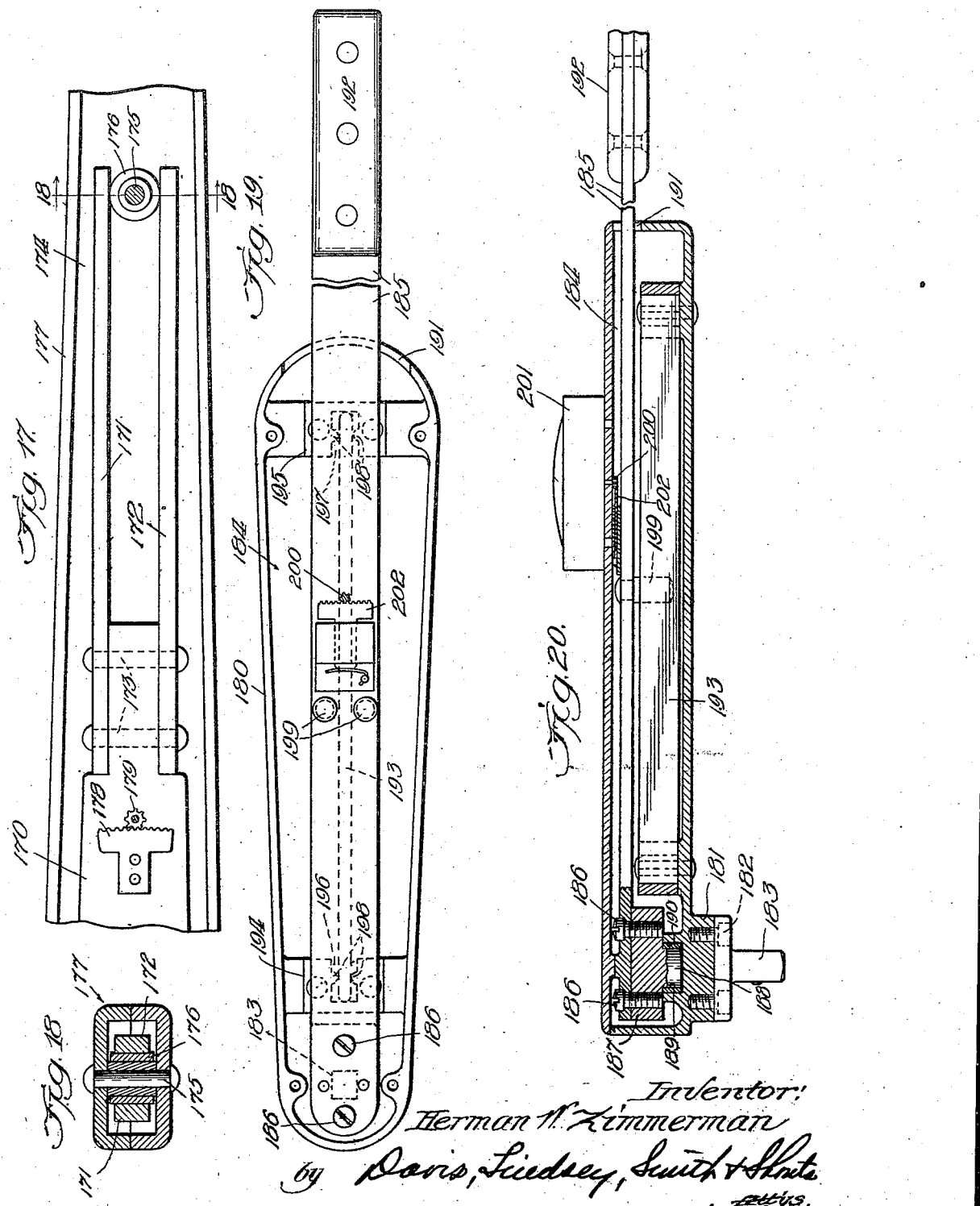

May 19, 1942.　　H. W. ZIMMERMAN　　2,283,888
TORQUE MEASURING WRENCH
Filed Nov. 22, 1937　　6 Sheets-Sheet 6
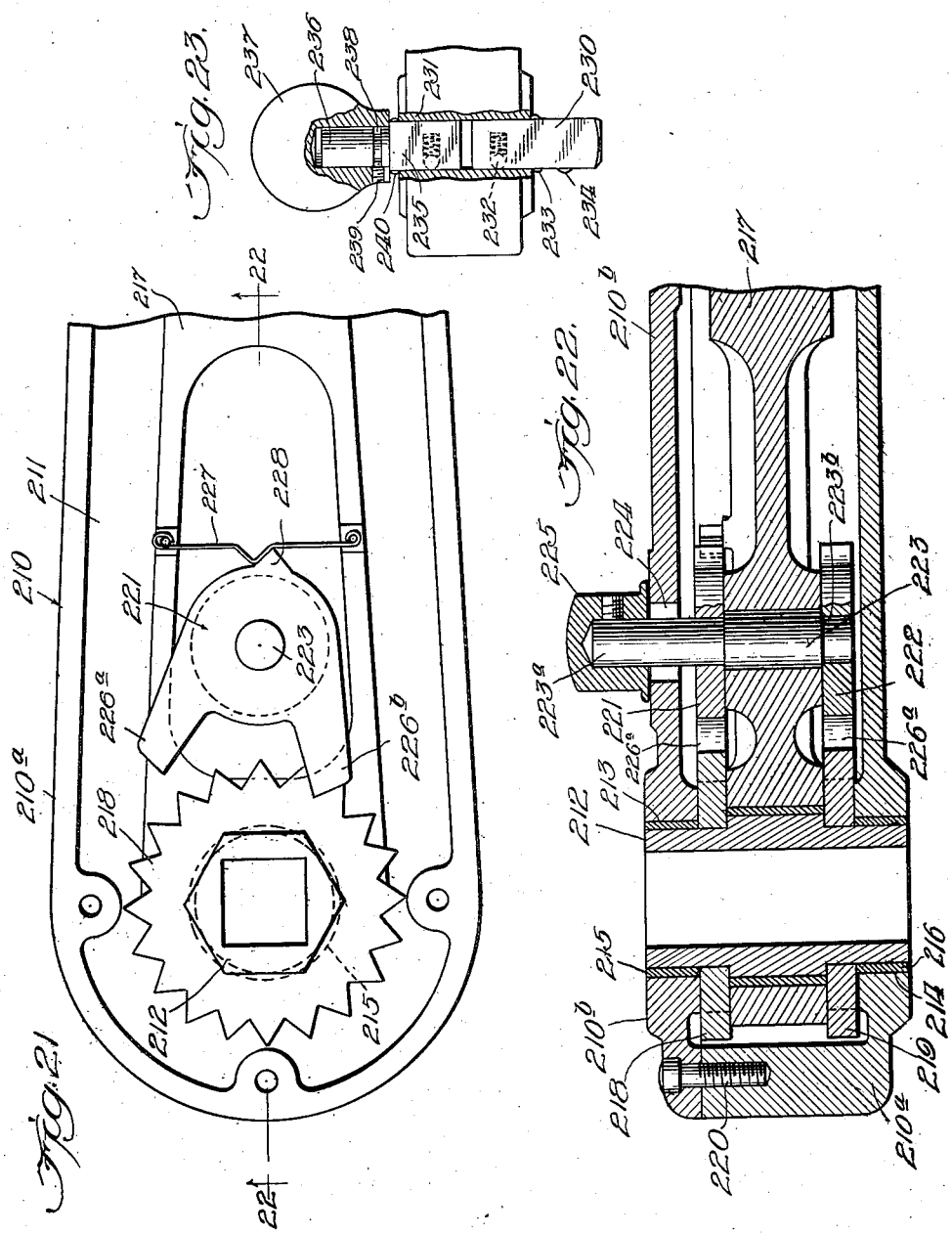
Inventor:
Herman W. Zimmerman
by Davis, Lindsey, Smith & Shonts
Attys.

Patented May 19, 1942

2,283,888

UNITED STATES PATENT OFFICE 2,283,888

TORQUE MEASURING WRENCH

Herman W. Zimmerman, Highland Park, Ill., assignor, by mesne assignments, to Automotive Maintenance Machinery Co., North Chicago, Ill., a corporation of Illinois Application November 22, 1937, Serial No. 175,863

38 Claims. (Cl. 265—1)

My invention relates to wrenches and it has to do more particularly with wrenches adapted for measuring the force or torque applied therethrough to nuts, bolts, studs, and other similar pieces of work.

My invention further has to do with a wrench embodying relatively movable members, such members being so arranged that one of them is operatively engaged with the work and relative movement between the members is yieldably opposed by spring means. In wrenches of this character, the force or torque applied through the wrench is determined by measuring the extent of relative movement between the wrench members as permitted by deflection of the opposing spring means.

The manufacture of a wrench of the foregoing kind presents various problems, one of which is inexpensive production of successive wrenches having a predetermined power rating and each of which will measure the force or torque applied to a certain piece of work in the same uniform precision manner. In other words, all wrenches of a certain power rating produced for any particular kind of work should, preferably, measure the force or torque applied in a substantially uniform manner without any appreciable variation in accuracy. I have found that this condition presents a difficult problem.

For example, coil springs have heretofore been employed for the foregoing purposes and, while they well serve their purpose in each individual wrench, they are subject to certain conditions involving the difficulties above mentioned. As is well known, it is customary in the manufacture of coil springs, and particularly those suitable for torque measuring wrenches, to first form or coil the spring from relatively soft wire and to then temper the same to the desired hardness. In this operation, a scale forms on the surface of the metal which cannot be practically removed in the formed coil spring, with the result that in a spring of this character, as it is compressed and expanded from time to time, the scale thereon tends to cause variation in accuracy of the tension of the spring. This variation tendency in different springs is not uniform. These variable conditions existing in different springs necessarily cause variation in the tensioning action of different coil springs even though they are manufactured successively under the same set of specifications. For these reasons, among others, manufacturers of coil springs do not usually guarantee the same to be accurately rated and they usually allow for a minimum percentage of error as high as 5 per cent. Spring tension variation of this extent requires very careful handling, sorting, testing and adjusting of springs that are to be used in the manufacture of precision devices like torque wrenches.

One of the objects of my invention is to provide an improved torque measuring wrench of the foregoing character which embodies spring means which is not subject to the foregoing objectionable conditions and in which the difficulties mentioned are eliminated.

Another object is to provide an improved wrench of the foregoing character which is simple in construction, is inexpensive to manufacture and to maintain in use, is of rugged and compact construction, and is adapted to measure the force or torque applied therethrough in a precision manner.

A further object is to provide a torque measuring wrench of the foregoing character wherein relative movement between the relatively movable wrench members is yieldably opposed by an elongated leaf-like spring means, which spring means is so constructed and arranged that any number of successive wrenches of the same class and power embodying the same may be manufactured with each wrench adapted to uniformly measure the force or torque applied to any particular piece of work.

An additional object is to provide an improved torque measuring wrench of the foregoing character which includes a leaf spring member formed of a high-grade steel to a predetermined size and shape and free from scale, which spring is of such character that successive similar springs may be made and assembled in the wrench with the assurance that successively made wrenches embodying the same will operate in a substantially identical manner.

Additional objects are to provide a torque measuring wrench of the foregoing character embodying precision spring means free from scale and other physical conditions that might tend to effect its deflection; to provide a torque measuring wrench of the foregoing character having spring means so constructed and arranged as to insure accuracy in the measurement of the force or torque, and which will continue to function in a highly accurate manner over long periods of time; and to provide an improved ratchet type torque measuring wrench embodying the foregoing features.

Other objects and advantages will become apparent as this description progresses and by reference to the drawings wherein—

Figure 1 is a top plan view of one form of wrench embodying my invention, the outer portion of the handle portion thereof not being shown;

Fig. 2 is a vertical, longitudinal sectional view taken substantially on line 2—2 of Fig. 1;

Fig. 3 is a top plan view of the structure shown in Figs. 1 and 2 with the top cover portion thereof removed;

Fig. 4 is an enlarged section taken substantially on line 4—4 of Fig. 2;

Fig. 5 is an enlarged section taken substantially on line 5—5 of Fig. 3;

Fig. 6 is an enlarged side elevational view of the dial structure shown in Figs. 1 and 2;

Fig. 7 is a top plan view of another form of wrench embodying my invention;

Fig. 8 is an enlarged horizontal sectional view of the wrench shown in Fig. 7, which view is taken substantially on line 8—8 of Fig. 9;

Fig. 9 is a longitudinal, vertical sectional view taken substantially on line 9—9 of Fig. 8;

Fig. 10 is a horizontal sectional view taken substantially on line 10—10 of Fig. 9;

Fig. 11 is a fragmental sectional view showing a modified form of means for mounting the spring which opposes relative movement between the wrench members;

Fig. 12 is a view similar to Figs. 3 and 8, except showing a further modified form of wrench embodying my invention;

Fig. 13 is a longitudinal, vertical sectional view taken substantially on line 13—13 of Fig. 12;

Fig. 14 is a vertical, longitudinal sectional view of still another form of wrench embodying my invention;

Fig. 15 is a horizontal sectional view taken substantially on line 15—15 of Fig. 14;

Fig. 16 is a section taken substantially on line 16—16 of Fig. 14;

Fig. 17 is a fragmental sectional view of another form of wrench embodying my invention;

Fig. 18 is a section taken substantially on line 18—18 of Fig. 17;

Fig. 19 is a view similar to Figs. 3, 8 and 12, except showing a further modified form of wrench embodying my invention;

Fig. 20 is a longitudinal, vertical sectional view through the structure shown in Fig. 19;

Fig. 21 is a fragmental view of a ratchet form of wrench embodying my invention;

Fig. 22 is a section taken substantially on line 22—22 of Fig. 21; and

Fig. 23 is an elevational view, partially in section, illustrating means that may be applied to the wrenches shown in Figs. 2 and 21 for engaging the wrench with the work and also for aiding in support of the wrench upon the work during the use thereof.

The wrench shown in Figs. 1 to 6, inclusive, includes a chambered head 30 to which is connected a handle 31. The head 30 includes a body section 32 having a rather deep chamber 30ª therein and a top cover section 33 secured to the body section 32 by a plurality of screws or other fastening devices 34.

The forward end of the head 30 rockably supports a work-engaging member 35. More particularly, the body and cover sections are provided with aligned openings 36 and 37 in which are received upper and lower reduced cylindrical hub-like portions 38 and 39 on the annular head 35ª of the work-engaging member 35. The work-engaging member is provided with a central opening 40 of rectangular or other suitable shape to prevent rotation of the supported part, and this opening is adapted to receive any suitable work-engaging adapter (not shown) for operatively connecting the wrench with the work.

The work-engaging member 35 is further and operably connected with the tool head 30 (Figs. 2 and 3) by spring means in such a way that relative rock movement between the head and work-engaging member, when the wrench is engaged with the work and the wrench handle 31 is actuated to tighten or loosen the work, is yieldably opposed; and by measuring the extent of relative rock movement between the head 30 and work-engaging member 35, as permitted by deflection of the spring means, I determine the amount of force or torque applied to the particular piece of work in tightening or loosening the same.

More particularly, the work-engaging member 35 is provided with a rearwardly-extending webbed arms 41 which terminates in a spring attachment head portion 42 (Figs. 2 and 3) having a longitudinally extending and vertically disposed slot 43 therein. The spring means that I employ takes the form of an elongated leaf-like spring member 44 having its forward end received within the arm slot 43 and fixedly secured therein by rivets 45 or other suitable securing devices. It is to be understood that the spring member 44 may be referred to as a strip spring member and that it may take the cross-sectional shape shown or any other suitable cross-sectional shape such as square, circular, oval or the like. The rear end of the spring 44 is connected to the wrench head 30 by a support unit 47 (Figs. 2, 3 and 4) which is automatically adjustable as the spring 44 is deflected to compensate for the changed position of the deflected spring and thereby avoid abnormal distortion of the spring, which, if it should occur, might create a condition causing a false registration of the torque or force being applied to the work.

The support unit 47 is located at the rear end of the wrench head chamber 30ª and it is pivotally carried by these sections in such a way as to maintain at all times substantially the same alignment relation between the longitudinal center line of the spring 44 and the axis of the unit 47. Specifically, the unit 47 (Fig. 4) includes a pair of end plate members 48 and 49 each having an outwardly extending cylindrical stud 50 rotatably engaging, respectively, in openings 51 formed in the body and cover sections 32 and 33. The end plates 48, 49 are connected together in spaced relation by post members 52 and 53 around which are disposed roller sleeve members 54 and 55. The post members 52 and 53 are spaced apart to such an extent and the sleeves 54 and 55 are of such diameter as to provide a space 56 between the sleeves 54, 55 in which the rear end of the spring 44 is received.

It will be seen that in the use of the foregoing structure, with the work-engaging member 35 applied to the work and with the operator grasping the handle 31 and moving the same to tighten or loosen the work, the handle 31, the tool head 30, the work-engaging member 35 and the work will tend to move as a single unit. However, when the work offers sufficient resistance to turning movement, as when tightening the same, to overcome the initial tension of the spring 44, such spring will be deflected, permitting relative rock movement between the work-engaging member 35 and the tool head 30. As the work offers added resistance, the deflection of the spring 44 will be increased, during which time the spring 44 becomes slightly bowed. As the spring 44 is deflected and bowed, the spring connecting unit 47 will rotate in its bearings 50 to accommodate the changed angular position of the spring 44 caused by its bowing so that the end portion of the spring 44 engaged with the unit 47 will always assume substantially the same position relative to the axes of the rollers 54, 55 of the unit 47, avoiding any cramping of the deflecting spring that would tend to influence or upset its normal deflecting action.

In further carrying out my invention, I construct the strip spring member 44 in such a way as to insure its operation wtih a high degree of accuracy at all times. The construction of the spring member is such that, for any particular wrench having a particular rated power, any desired number of springs may be made up and, when applied to wrenches, they will all function with substantially uniform rated accuracy. To this end, I employ a spring member formed of a high-grade steel which is tempered to the desired hardness to provide the desired tension rating. The tempered spring is then ground or otherwise treated to remove all scale therefrom and to give it predetermined dimensional characteristics so that a predetermined pressure will be required to cause an initial deflection of the spring and to cause deflection of predetermined extent. By providing a strip spring member of this character I find that by mounting it in the manner described, the force or torque applied to the work may be measured in a precision manner and that manufacture of wrenches of this character in quantity is facilitated and may be carried out in an inexpensive way without sacrifice in precision requirements. For any particular wrenches of predetermined size and power rating, parts may be made up in quantity with the assurance that they may be assembled into complete wrenches that will have the desired power rating.

It will be understood that the power rating of any spring 44 may be varied by changing the cross-sectional area thereof and/or by using a spring having a greater or less active length between the work-engaging member and the unit 47. This effect may also be accomplished by varying the length of the work-engaging arm 41; but once these conditions have been established in any wrench having a particular rated power, successive wrenches may be accurately reproduced with each having a substantially uniform power rating.

The relative movement between the head 30 and the work-engaging member 35 is measured, preferably (but not necessarily) in terms of inch-pounds pressure applied, by indicating mechanism which will now be described. Specifically, I employ a detachable indicator unit which includes a cup-shaped casing 57 (Figs. 1 and 2) having its bottom part secured to the cover section 33 by a pair of diametrically opposed screws 58. The openings through which the screws 58 extend take the form of elongated arcuate slots 59 that permit substantial rotation of casing 57, which rotation is tensioned by spring washers 60 disposed between the heads of the screws 58 and the adjacent wall of the casing 57. The casing 57 is provided with an inverted, cup-shaped, transparent cover 61, having a skirt portion 61ª snugly fitting against the inner part of the side wall of the casing 57. The side wall of the casing 57 is provided with a circumferentially extending slot 62 (Fig. 6) which is covered by the transparent cover side wall 61ª, for a purpose which will be referred to more particularly hereinafter.

The indicator unit further includes an inverted cup-shaped dial drum 63 (Fig. 2), the side wall 63ª of which extends in substantially parallel relation to the side walls of the casing 57 and cover 61. The top of the dial drum 63 is provided with a graduated scale 64 and the side wall of the drum is provided with a corresponding scale 65. The top of the transparent cover 61 has an indicating mark 66 and the skirt 61ª of the transparent cover at the center of casing slot 62 is provided with a corresponding indicating mark 67. With the foregoing construction, the casing 57 and cover 61 may be set as a unit so that the indicating marks 66 and 67 coincide with any desired mark (zero, for example) on the dial scales 64 and 65, respectively; and, by rotating the dial 61 in either direction, the extent of relative movement of head 30 and member 35 and the pressure applied through these members to the work will be indicated by the extent of movement of the dial scales relative to the indicating marks 66 and 67.

The dial drum 63 is carried by a tubular shaft element 68 which extends downwardly through the central boss-like portion of the bottom part of the casing 57 and it fixedly receives a shaft 69 extending into the head chamber 30ª where it receives a pinion 70 which is operatively engaged with a rack member 71 carried by the work-engaging member arm 61.

The rack member 71 is provided with a squared and toothed rack portion 71ª which directly engages the pinion 70, and this rack member is supported for longitudinal adjusting movement to accommodate the arcuate movement of its supporting arm 41 when relative rock movement takes place between the head 30 and work-engaging member 35. Specifically, the rack member is of T-shape and its T-stem portion 71ᵇ is snugly and slidably received in a slideway 72 formed by a recess in a cross plate 73 supported by the upper rear end portion of the work-engaging member arm 41. The rear end of the rack member stem 71ᵇ is engaged by a U-shapea spring 74 carried by the arm 41, which spring is so constructed and arranged as to continuously urge the rack member forwardly into engagement with the pinion 70 but will permit the rack member to be moved backwardly and forwardly to accommodate the arcuate movement of the rack member above mentioned. With this arrangement, as soon as the work offers sufficient resistance to overcome the initial tension of the spring 44, such spring will be deflected and the head member 30 will rock relatively to the work-engaging member 35 and its arm 41, thereby moving the indicating unit 57 and its pinion 70 relative to the rack member 71 and causing the dial drum 63 to rotate. The extent of rotation of the dial drum and the amount of pressure applied to effect such rotation may be accurately determined by noting the extent of movement of the dial scales relative to the indicating marks 66 and 67. At times, the operator, when actuating the wrench, may be in such a position that the dial scale 64 is within his vision while, at other times, the dial scale 65, at the side of the dial drum, may be within his vision. In either event, he can readily determine the dial scale reading and the amount of pressure applied.

It will be appreciated that there is a safe limit to the extent of deflection of the spring 44. To avoid over-deflection of such spring and, in turn, probable detrimental distortion of the same which might affect accuracy of the wrench, inwardly-extending stop lugs 32ᵃ and 32ᵇ of equal length are provided on opposite side walls of the head chamber 30ᵃ adjacent the rear end of the arm 41. The forward end of the arm 41 will abut against the stops 32ᵃ and 32ᵇ upon a predetermined, relative rotational movement between the head 30 and work-engaging member 35. These lugs 32ᵃ and 32ᵇ are of such length that they stop further relative rotational movement of the parts when the safe deflection limit of the spring is reached or is nearly reached. Of course, the stop lugs 32ᵃ and 32ᵇ may be of any desired length to limit the deflection of the spring 44 to any desired extent.

Wrenches embodying my invention may take various forms, and in Figs. 7 to 10, inclusive, I have shown another form which may well serve my purpose in taking care of certain kinds of work. Specifically, this wrench includes a head 80 having a handle 81 thereon. The head 80 includes a bottom chamber section 82 and a removable top cover section 83 which supports an indicating unit 84. The head sections provide a head chamber 85 in which I rockably mount a work-engaging member 86. The work-engaging member is provided with a stepped stub shaft portion 87 which finds suitable bearing in a thickened forward portion or boss 88 in the bottom section 82, and this shaft is of sufficient length to extend below the boss 88 where it receives a collar 89 secured thereto by lock screws 90, whereby the shaft and the work-engaging element 86 are fixedly secured in place for rock movement. The outward projecting end of the shaft 87 is provided with a shank or other suitable means 91 for direct engagement with the work or for reception of suitable adapter means which may be engaged with the work, as determined by the character of the work to be tightened or loosened.

The work-engaging member is slotted to receive one end of a strip spring member 92 similar to the previously described spring 44 and which spring is secured in place by screw members 93. The spring 92 extends rearwardly within the head chamber 85 and its rear end is operably connected with the head 80 by adjustable abutment means. More particularly, the head 80 near the rear end of the chamber 85 is provided in its sides with aligned threaded openings 94 in which are received abutment members having a threaded shank 95 and a rounded abutment head 96 projecting into the head chamber. The spring 92 extends rearwardly between the abutment members and such members are adjusted inwardly, preferably to similar extents, substantially into engagement with the side faces of the spring 92 so that when the wrench handle 81 is grasped and rotated in either direction the pressure applied will be transmitted through the head 80, the spring 92 and the work-engaging member 86 to the work.

As in the first-described form, when the work offers sufficient resistance to overcome the initial tension of spring 92, relative rock movement takes place between the head 80 and work-engaging member 86, and by measuring the extent of this movement one may determine, through the indicating unit 84, the amount of pressure applied. The indicating unit 84 may include a hand 97 movable relative to a dial 98 having a scale 99 thereon calibrated to register, preferably (but not necessarily), inch-pounds pressure. The hand 97 is connected through suitable shaft means 100 to a pinion 101 which is operably connected to the work-engaging member 86. More particularly, the work-engaging member 86 is connected to the pinion 101 by an arm 102, the forward end of which is fixedly secured to the work-engaging members by screws or other suitable fastening devices 103. The rear end of the arm 102 is provided with a rack portion 102ᵃ which engages the pinion 101; and, with this arrangement, when the work offers sufficient resistance to cause deflection of the spring 92 and relative movement of the head 80, as when tightening the work, such movement of the head and pinion 101 relative to the rack portion 102ᵃ will cause the gage hand 97 to rotate relative to the dial scale and register the extent of this movement in terms of pressure applied.

The side walls of the bottom section 82 of the head are provided with stop lugs 104 which are adapted to engage the opposite faces of the spring 92 upon a predetermined relative rotational movement between the parts, thereby limiting the extent of deflection of the spring 92 within safe operating limits. This arrangement is substantially the same as the spring stop arrangement of the first-described form, except that the stop members here engage the spring instead of the work-engaging member.

In order to lessen the tendency of the abutment elements 96 to cramp the spring 92, the spring-contacting portions of these abutments are rounded as shown in Fig. 8. However, if desired, rollers 105 may be substituted for the abutment elements 96, as shown in Fig. 11. More particularly, the casing head 106 (Fig. 11) is provided with a chamber 107, similar to the chamber 85, and the rear portion of the wall of this chamber is provided with a pair of vertical and arcuate-shaped roller seats 108 in which the rollers 105 are received. These rollers are of such diameter and the seats 108 are spaced apart to such an extent that the rear end of the strip spring 109 is snugly received therebetween. The roller action between the spring and rollers will tend to minimize the tendency to cramp the spring 109 and abnormally distort the same.

My invention is also adaptable to so-called double-handle wrenches, or wrenches having two oppositely extending handles adapted to be grasped by the hands of a single operator or by different operators. To this end, I may employ a structure similar to that shown in Figs. 12 and 13, which includes a wrench head 110 having aligned handles 111 and 112 extending from the opposite ends thereof.

The wrench head 110 (Figs. 12 and 13) is formed of a chambered bottom section 113 and a top section 114 providing a head chamber 115. Within the chamber 115, and preferably midway between the handles 111, 112, I employ a work-engaging member 116 similar in construction and mounting to the work-engaging member 86 of the second-described form. The work-engaging member 116 is provided with a cross slot in which is secured a strip spring 117. The spring 117 is of sufficient length to extend substantially throughout the length of the head chamber 115 and its mid-portion is secured in the work-engaging member slot by suitable rivets or other fastening devices 118. In this way, strip spring arms or elements 117ᵃ and 117ᵇ, of substantially equal length, extend in opposite directions from the work-engaging member 116. If desired, the strip spring arms may take the form of separate spring members having their adjacent ends rigidly carried by the work-engaging member 116.

The free ends of the spring arms 117ᵃ and 117ᵇ are operably connected with the head 110 by rounded abutment elements 119 and 120 disposed on the opposite side walls of the head so that when the handles 111 and 112 are grasped and rotated in clockwise direction (as viewed in Fig. 12), as in tightening the work, both spring arms 117ᵃ and 117ᵇ will be effective to yieldably oppose relative rotation between the head 110 and work-engaging member 116.

In the use of this structure, as with the previously described structures, when the work offers sufficient resistance to overcome the initial tension of the spring arms 117ᵃ and 117ᵇ, head 110 will rotate clockwise relative to the work-engaging member and, by measuring the extent of this movement, one may determine the amount of pressure applied. This measurment may be accomplished by an indicating unit 121 similar to the indicating unit of the first-described form, except that a stationary dial 122 and a rotatable hand 123 are employed instead of the drum dial structure 63.

The rotatable hand 123 (Fig. 13) which corresponds to the hand 97 (Fig. 7) is carried by a rotatable shaft 124 which extends into the head chamber 115 where it receives a pinion 124. The pinion 124 meshes with a larger gear 125 supported by a shaft 126, the opposite ends of which are journaled in the cover section 114 and in a cross-supporting bracket 127 secured to the under side of the section 114 by screws 128. The shaft 126 carries another small gear 129 which meshes with a larger gear 130 having a hub portion 131 detachably secured to the upper portion of the work-engaging member by a pair of spaced pins 132 (only one shown in Fig. 13). With this arrangement, as relative rotational movement takes place between the head 110 and the work-engaging member 116, the movement of the gear 129 relative to the gear 130 transmits motion to the hand 123 through the gears 125 and 124. The dial 122 is provided with a scale (not shown) similar to the scale 99 (Fig. 7) calibrated, preferably, in terms of inch-pounds pressure, and by reading the extent of movement of the hand 123 relative to the dial scale, the operator may determine the amount of pressure applied.

The wrench structure shown in Fig. 12 is adapted particularly for measuring the pressure applied in tightening the work. To adapt the wrench for operation as a substantially rigid structure when loosening the work, I provide adjustable abutment screws 133 and 134 in the opposite side walls of the bottom head section 113, which screws are opposed to the abutment elements 119 and 120. The screws 133 and 134 may be adjusted into light engagement with the spring arms 117ᵃ and 117ᵇ, respectively, or they may be slightly spaced therefrom, as desired. In either event, they are locked in the desired position by the lock screws 135 and 136. The screws 133 and 134 may serve, when adjusted into contact with the spring arms 117ᵃ, 117ᵇ, as initial tension adjustment means. It will be seen that by setting up these screws against the spring arms to any desired extent, the initial tension of the spring arms may be increased so that a greater initial pressure will be required to deflect the same. This feature may serve for compensating purposes, as, for example, slight wear of the parts may take place over a long period of use and the gage mechanism may for this reason fail to register accurately. By setting up the screws 133 and 134, any out-of-register condition, and particularly an initial register condition, may be corrected. So far as the loosening action is concerned, it will be seen that when the wrench handles are moved in a counterclockwise direction, the head 110 and screws 133, 134 contact the spring arms 117ᵃ, 117ᵇ in close proximity to the work-engaging member 116 so that the loosening pressure may be applied through a substantially rigid series of connections. It will be understood that, so far as the foregoing tensioning feature is concerned, it may well be applied to any of the wrench forms disclosed herein.

In certain instances it may be desirable to employ wrenches having long handles, and where the work acted upon is at a considerable distance away from the operator so that he cannot readily observe the indicating mechanism when it is located as shown in the previous forms. To take care of this condition, in the use of my invention, I may employ the structure shown in Figs. 14 to 16, inclusive. This structure includes a head 140 and an elongated hollow handle 141. The head 140, the work-engaging member 142 and strip spring 143 of this form are substantially identical with the form of Fig. 8 and it will not, therefore, be necessary to describe these parts and their mountings in detail.

Relative rock movement between the head 140 and work-engaging member 142 is measured by an indicating unit 144 which is substantially the same as the indicating units of the forms of Figs. 8 and 13, except that this unit is located remotely from the work-engaging member 142 and in close proximity to a handle portion 145 that may be grasped by the operator. The unit 144 is provided with a tubular body portion 146 which receives the rear end of the forward handle portion 141 and the forward end of the rear handle portion 145, thereby coupling these handle portions together as a unit.

Relative rock movement of the parts is transmitted to the indicating unit 144 by transmission mechanism which will now be described. This transmission mechanism includes a flat arm 147 mounted within the head 140 and a shaft 148 connected to an indicator pinion 149 by a gear 150. The forward end of the arm 147 is fixedly secured to the work-engaging member 142 by screws or other suitable fastening devices 151. This arm extends rearwardly slightly past the rear end of the spring 143 and it is provided with a longitudinally extending elongated slot 152 in which is received an upstanding arm 153 on a head member 154 secured to the forwardly extending end of the shaft 148. The shaft is rotatably supported by suitable bearing members 156 mounted within the hollow handle portion 141.

In the use of this structure, as relative rock movement between the parts takes place, as for example when tightening the work, the movement of the head 140 and handle portions 141 and 145 causes a counterclockwise movement of the shaft 148 (as viewed from the front end of the wrench), in turn rotating the gears 150 and 149 so as to move the gage hand 157 in a clockwise direction. When the wrench is released and the parts are returned to normal position, the reverse movement of the parts takes place. Backlash in both of these movements is guarded against by a clock-type spring 158 (Fig. 16) having one end secured by a screw 159 to the bottom section of the wrench head, the same extending spirally around the shaft head 154 and being connected to such head as at 160. This spring tensions the movement of the shaft in such a way as to cause it to move with a smooth action, thereby insuring a more positive and accurate indication by the indicating unit.

In certain instances, I may employ a pair of separate, independently acting strip spring members for measuring the pressure applied in both tightening and loosening the work. Such an arrangement is shown in Figs. 17 and 18. Referring particularly to Fig. 17, the structure shown is similar to that of Figs. 1 and 2 except that the rear end of the work-engaging member arm 170 is shaped to provide a reduced tongue to which the forwardly extending ends of similar strip spring members 171 and 172 are secured in oppositely facing relation by rivets or other suitable fastening devices 173. The rear end portion of the head chamber 174 is provided with an upright post member 175 around which is disposed a sleeve unit 176 that provides a roller abutment mounting for the rear ends of the spring members 171 and 172. That is to say, the spring members 171 and 172 are long enough to extend rearwardly slightly past the roller unit 176, and they are spaced apart to such an extent that their adjacent faces snugly engage the roller unit 176. With this arrangement, as the work is tightened and the head 177 rotates relatively to the work-engaging arm 170, the spring member 172 is operative to yieldingly oppose this movement. When the work is loosened, the other spring member 171 becomes operative in opposing relative movement of the parts. Relative movement of the parts may be measured by any suitable indicating mechanism, such, for example, as any of those previously described. The indicating structure may include a rack member 178 engaged with a pinion 179 adapted to be carried by an indicating unit connected to an indicator of any suitable kind as, for example, the drum dial 63 of Fig. 2 or the gage hand 97 of Fig. 7.

My invention is also well adapted to an arrangement wherein the wrench head portion is adapted to be non-rotatably secured to the work, and the handle part which the operator grasps is, on the other hand, rotatable relative to the work. In Figs. 19 and 20 I show a wrench of this character which includes a chambered head 180 having, on the lower side of its forward end, a thickened boss portion 181 to the bottom of which is detachably secured, by screws or other fastening devices 182, a work-engaging adapter member 183. Within the chamber 184 of the head I rotatably or rockably mount a handle member 185. More particularly, the forward end of the handle 185 is detachably secured, by screws or the like 186, to a supporting member 187 having a depending stub shaft portion 188 rotatably mounted in an annular opening 189 formed in the inner wall of the thickened boss 181. An antifriction bearing member 190 is associated with the stub shaft 188 for a purpose which will be obvious.

The handle 185 extends throughout the head chamber 184 and projects rearwardly therebeyond through an elongated slot 191 formed in the rear end of the head 180. The outwardly projecting end of the handle is provided with a grip portion 192 which facilitates use of the structure.

Relative rotation or rock movement between the head 180 and handle 185 is yieldingly opposed by a strip spring member 193 carried by the head 180. To this end, spring supporting block members 194 and 195 are mounted within and adjacent the opposite ends of the head chamber 184 and they are provided with facing slots 196 and 197 in which the opposite ends of the strip spring member 193 are freely received. The opposite side walls of the slots are provided with abutment elements 198 which have substantially point-contact engagement with the adjacent surfaces of the strip spring 193, thereby minimizing frictional contact between these parts. The handle 185 is disposed above the spring 193 and it is provided, adjacent the mid portion of the spring 193, with laterally-spaced depending pins 199 which are adapted to engage the spring 193 on the opposite sides thereof. In this way, the tendency of the handle 185 to rotate relatively to the head is yieldingly opposed by the spring 193 but, when the work offers sufficient resistance to overcome the initial tension of such spring, the spring will be deflected and deflection will take place to an extent dependent upon the amount of pressure applied.

By measuring the extent of this deflection, I determine the amount of pressure, preferably inch-pounds, applied through the handle and spring to the work. The mechanism for measuring this deflection may take the form of indicating mechanism like that shown in Fig. 3, including a pinion 200 supported by a head-carried gage device 201 and a yieldable, shiftable rack member 202 carried by the handle 185. Other than above stated, the operation of this form of wrench is substantially the same as the forms previously described.

In taking care of various kinds of work, it is desirable to employ a ratchet form of wrench structure. My invention is well adapted to a wrench of that character, by so constructing the ratchet mechanism that wear thereof is minimized and any distortion thereof which would cause inaccurate reading of the gage structure is avoided. In Figs. 21 and 22, I have shown one form of torque measuring ratchet wrench in which the foregoing objectionable conditions are avoided, and which is adapted to operate with a ratchet action while, at the same time, measuring the force or torque applied in a highly efficient and accurate manner. More particularly, referring to Figs. 21 and 22, I employ a head part 210 which may be similar to the heads of the wrenches shown in Figs. 1 to 18, inclusive, and which is provided at its rear with a handle (not shown) adapted to be grasped by the operator. Within the wrench head chamber 211 I rotatably mount a work-engaging member 212 with which is associated ratchet mechanism. More particularly, the body and cover portions 210$^a$ and 210$^b$ of the wrench body, at the forward end thereof, are provided with aligned openings 213, 214 in which the opposite reduced end portions of the work-engaging member 212 are rotatably received. For friction-reducing purposes, the opposite ends of the work-engaging member 212 are engaged with the body by anti-friction bearing members 215 and 216. Upon the central and enlarged portion of the work-engaging member 212 I rotatably mount an arm 217 which may be constructed similarly to the arm shown in Figs. 2 and 3. The rear end of this arm is connected with a strip spring member (not shown) which is, in turn, connected with the body 210 in any of the ways shown in Figs. 1 to 18, inclusive, so that relative rotational or rock movement between the body 210 and the arm 217 is yieldingly opposed by said spring member.

The arm 217 is operably connected to the work-engaging member 212 by a ratchet mechanism which will now be described.

Similar ratchet wheels 218 and 219 are mounted upon the reduced end portions of the work-engaging member at the opposite ends of the enlarged central portion of such member. The ratchet wheels each have a polygonally shaped central opening and the portion of the work-engaging member engaged thereby may be complementally shaped so that the ratchet wheels are non-rotatably fixed upon the work-engaging member 212. The arrangement of these parts is such that when the body cover, the work-engaging member, arm 217 and ratchet wheels are assembled in the manner shown in Fig. 22 and they are secured in that position by one or more cover screws 220, the parts are operatively assembled so that the ratchet wheels rotate with the work-engaging member.

The ratchet mechanism further includes a pair of double pawl members 221, 222 carried by the arm 217, which serve to operatively connect such arm with the work-engaging member. More particularly, a shaft 223 is rotatably mounted in the arm 217 and has reduced end portions 223ᵃ and 223ᵇ projecting above and below such arm. Upon the reduced end portions 223ᵃ and 223ᵇ of the shaft 223, and in guide-abutment engagement with the upper and lower sides of the arm 217, I fixedly secure the pawl members 221 and 222. The end 223ᵃ of the shaft 223 extends upwardly and through an elongated opening 224 in the head cover 210ᵇ where it receives a finger-piece 225 which may be grasped and actuated to properly set the pawl members 221 and 222, as will be mentioned more particularly hereinafter.

Each pawl member 221, 222 has a pair of similar pawl elements 226ᵃ and 226ᵇ which project forwardly so that in certain adjusted positions thereof they will, respectively, engage the teeth of the ratchet wheels 218 and 219. The pawl members 221, 222 are moved simultaneously to similar extents by adjustment of the shaft 223 and when these members are rotated to the position shown in Fig. 1, the pawl element 226ᵇ is thrown into engagement with the ratchet wheels. The pawl members are held in the position shown by the upper and lower laterally directed leaf spring members 227 which have V-shaped mid portions that are engaged by similarly-shaped projections 228 on the adjacent peripheral surfaces of the pawl members. Such spring members yieldably hold the pawl members in the position, for example, shown in Fig. 21; however, if it is desired to reverse the pawl action so that the pawl elements 226ᵃ are operatively engaged with the ratchet wheels, it is only necessary to grasp the finger-piece 225 and rotate the same in counterclockwise direction (as viewed in Fig. 21) to snap the pawl member projections 228 on the side of the V-shaped spring portions opposite that shown in Fig. 21.

In the use of the ratchet structure shown, with the pawl element 226ᵇ engaged with the ratchet wheel, the arm 217 and work-engaging member 212 are operatively connected as a rigid unit when the wrench is moved in a clockwise direction (as viewed in Fig. 21) to tighten the work. When the wrench is moved in the opposite direction, with the parts so set, the ratchet wheels 218 and 219 will remain stationary and the pawl elements 226ᵇ, through the yielding connection afforded by the springs 227, will slip in counterclockwise direction over the teeth of the ratchet wheels. In this way, an ordinary ratchet action is accomplished in tightening or moving the work in a clockwise direction. The same operation takes place when the ratchet members 221, 222 are adjusted, as above stated, to operatively engage the pawl elements 226ᵃ for operative action in the reverse direction. Other than above mentioned, the construction and operation of this form of wrench may be similar to any of the forms shown in Figs. 1 to 18, inclusive.

The wrench as shown in Figs. 2 and 22 may be connected to the work through a work-adapter member such as the member 230 shown in Fig. 23. To this end, the work-engaging member 231 is provided with a rectangular, or other non-circular opening, and the upper or inner end of the work-adapter member 230 is similarly shaped. This part of the member 230 may be provided with a spring and ball friction attachment 232 to prevent the adapter member from accidentally becoming detached. Such adapter may also be provided with stop lips or lugs 233 for preventing the adapter from being inserted too far within the work-engaging member opening. The lower projecting portion of the work-adapter member 230 may also be provided with a spring and ball attachment connection 234 so that a socket or other work-engaging element may be firmly held in place thereon.

At times, the operator may wish to rest his hand upon the forward part of the wrench to steady his movements in tightening the work. In that case, I may employ the hand-supporting structure shown in Fig. 23. Specifically, the upper end of the work-engaging member opening receives a hand supporting unit having a shank portion 235 constructed similarly to the upper or inward end of the work-adapter member 230. The shank portion 235 projects outwardly above the wrench structure as at 236 and is, preferably, of cylindrical shape for rotatable reception of the ball-like hand-grip member 237. The cylindrical extension 236, inwardly from the end thereof, is provided with a groove 238 for the reception of a stud 239 carried by the grip member 237, whereby the grip member is rotatably fixed against outward displacement upon the cylindrical extension 236. The extent of insertion of the shank 235 within the work-engaging member opening is limited by stop lugs or the like 240 similar to the stop lugs 233.

I believe that the operation and advantages of my invention as above first stated will be readily understood from the foregoing description. It is to be further understood that while I have shown and described several forms of wrenches embodying my invention, other changes in details and arrangements of parts may be resorted to without departing from the spirit and scope of my invention as defined by the claims that follow. For example, in a two-spring construction like that shown in Figs. 17 and 18, the springs may be fixedly carried in laterally spaced relation by the wrench head and their free ends may frictionally and freely engage the opposite sides of the end of an arm corresponding to the arm 170 (Fig. 17). Also, this same arrangement may be employed where a single strip spring member is used; in which case, the rear end of the strip spring member would be fixedly carried by the wrench head and its other or forward end would be freely and frictionally engaged with the rear end of the work-engaging member arm. In other words, the connections of the spring 44 shown in Figs. 2 and 3 may be reversed so that the spring is fixedly connected at one end to the head instead of to the work-engaging member arm.

I claim:

1. A torque measuring wrench comprising a head member having a chamber therein, a work-engaging member rockably mounted in said chamber and having an exposed part adapted for engagement with the work, a normally straight and stiff strip spring member mounted in said chamber and having one end connected to said work-engaging member, means mounted in said chamber having slidable engagement with opposite side portions of said spring member and connecting the other end of said spring member with said head member so that right and left hand threaded work may be tightened, pressure indicating means, and means between said indicating means and said work-engaging member for actuating the former as said head and work-engaging members rock relatively.

2. A torque measuring wrench comprising a head member, a work-engaging member rockably supported thereby, a strip spring member, means for connecting one end of said spring member to said work-engaging member, a support for the other end of said spring member having a swivel connection with said head member to accommodate flexing action and reciprocation of said spring member as said head and work-engaging members are rocked relatively, and means for indicating the pressure applied to the work through said members.

3. A torque measuring wrench comprising a head member, a work-engaging member rockably supported thereby, a strip spring member, means for rigidly connecting one end of said spring member to said work-engaging member, a roller support for the other end of said spring member having a swivel connection with said head member to accommodate flexing action of said spring member as said head and work-engaging members are rocked relatively, and means for indicating the pressure applied to the work through said members.

4. A torque measuring wrench adapted for use with means for indicating the force applied by the wrench to the work comprising a head member, a work-engaging member rockably supported thereby, a strip spring member, means for connecting one end of said strip member to said work-engaging member, and abutment connection means between the other end of said spring member and said head member, including a pair of rollers between which said other end of said spring member is received, means supporting said roller members as a unit and for rotatively connecting such unit to said head member.

5. A torque measuring wrench comprising a head member, a work-engaging member rockably supported thereby, a strip spring member, means for connecting one end of said spring member to said work-engaging member, a pivotal support for the other end of said spring member carried by said head member, said support confining said end of said spring member against lateral displacement, and means for indicating pressure applied to the work by registering the extent of relative rock movement of said head and work-engaging members.

6. A torque measuring wrench comprising a head member, a work-engaging member rockably supported thereby, a strip spring member, means for connecting one end of said spring member to said work-engaging member, an abutment roller support for the other end of said spring member, comprising a pair of spaced roller members carried by said head member and between which the adjacent end of said spring member is freely received, and means for indicating pressure applied to the work by registering extent of relative rock movement of said head and work-engaging members.

7. A torque measuring wrench comprising a head member having a chamber therein, a work-engaging member rockably mounted in one end of said chamber and having an arm extending rearwardly toward the other end of said chamber, the rock axis of said work-engaging member coinciding with the axis of rotation of the work, a normally straight spring bar rigidly connected at one end to and extending lineally from the rear end of said arm and connected at its other end to said head member to yieldably oppose relative rock movement between said head and work-engaging member, and indicating means associated with said arm and head member and operated by said arm for registering the extent of relative rock movement between said head and work-engaging members.

8. A torque measuring wrench comprising a head member, a work-engaging member rockably connected thereto, a long normally straight spring bar connected at one end to said work-engaging member, means engaging opposite sides of said spring bar and connecting its other end to said head member, whereby said spring bar yieldably opposes relative rock movement of said members in opposite directions, stop means for limiting the extent of relative rock movement between said head and work-engaging members and also the extent of deflection of said spring bar, and indicating means for registering the extent of said relative rock movement.

9. A wrench for applying torque in opposite directions comprising a head member, a work-engaging member rockably connected thereto, a long and normally straight spring bar, means rigidly connecting one end of said spring bar to one of said members, adjustable abutment means carried by the other of said members and engaging opposite side portions of said spring bar and operatively connecting said spring bar with said other member, and indicating means for registering the extent of relative rock movement between said head and work-engaging members in either direction.

10. A torque measuring wrench comprising a head member having provision for operably engaging it with the work, a handle member rockably connected to said head member, a strip spring member carried by said head member in such a manner that its mid portion is free to flex, and means operably connecting said handle member to said midportion so that said spring member yieldably opposes relative rock movement between said head and handle members.

11. A torque measuring wrench comprising a hollow head member having an elongated slot in its rear wall and also having provision for operably engaging it with the work, a handle member projecting through said slot into said head member, means in said head member whereby said handle member is rockably connected to said head member, a strip spring member carried within said head member in such a manner that its midportion is free to flex, means within said head member operably connecting said handle member to said midportion so that said spring member yieldably opposes relative rock movement between said head and handle members, and means indicating extent of relative rock movement of said head and handle members.

12. A torque measuring wrench adapted for use with means for indicating the force applied to the work which comprises, a handle member having a grip portion adjacent one end thereof, a work-engaging member pivotally connected with the other end of said handle member, said work engaging member having means through which it may be connected with the work, which means is located substantially on the pivotal axis of said work-engaging member, and a normally straight spring bar carried by said work-engaging member, and extending away from and in substantially radial alignment with the said work-engaging member, said spring bar being positioned between the axis of said pivot and said grip portion, said handle member having means engaging said spring bar at a predetermined distance from the axis of rotation of said work-engaging means and at a point between said work-engaging means and said grip portion to provide a substantially constant moment arm, whereby when a rotary force is applied to said grip member the same will be transmitted through said handle member to said spring bar and through said spring bar to said work-engaging member.

13. A torque measuring wrench adapted for use with means for indicating the force applied to the work, which comprises a handle member having a grip portion on one end thereof, a work-engaging member having an element thereon which is adapted to be connected to the work, said work-engaging member having a portion pivotally connected to the other end of said handle member, substantially on the axis of said work-engaging element, a spring bar supported by one of said members in end to end alignment with said pivotally connected portion and said grip portion, which said spring bar is held against longitudinal displacement relative to said one member, a connection between the other of said members and said spring bar, said connection permitting slight longitudinal displacement of said spring bar, whereby relative rotation between said members causes deflection of said spring bar and there is provided a constant moment arm through which force is applied from said grip portion through said handle member, thence through said spring bar, and finally through said work-engaging member to the work.

14. A torque measuring wrench adapted for use with means for indicating the force applied to the work which comprises, a handle member having a longitudinally extending grip portion adjacent one end thereof, a work engaging member pivotally supported adjacent the other end of said handle, the pivotal axis of said work-engaging member coinciding with the axis of rotation of the work, a normally straight spring bar disposed in radially aligned end to end relation to said grip portion and said work engaging member, said spring bar having one end connected to said work engaging member with its other end slidably connected with said handle member at a point radially inwardly of said grip portion, whereby there is provided a constant moment arm and pressure applied to said grip portion is transmitted to the work through said handle member, thence forwardly through said spring bar and finally through said work engaging member.

15. A torque measuring wrench adapted for use with means for indicating the force applied to the work which comprises, a handle member having a longitudinally extending grip portion adjacent one end thereof, a work engaging member pivotally supported adjacent the other end of said handle, the pivotal axis of said work-engaging member coinciding with the axis of rotation of the work, a normally straight spring bar disposed in radially aligned end to end relation to said grip portion and said work engaging member, said spring bar having one end thereof fixably connected to one of said members and its other end engaged with the other of said members, whereby there is provided a constant moment arm and pressure applied to said grip portion is transmitted to the work through said handle member, thence forwardly through said spring bar and finally through said work engaging member.

16. A torque measuring wrench which comprises a handle member, a work-engaging member pivotally supported adjacent one end of said handle member, the pivotal axis of said work-engaging member coinciding with the axis of rotation of the work, an arm on said work-engaging member and extending longitudinally of said handle member, a spring bar having one end carried by said arm and extending longitudinally along said handle member, said arm and spring bar constituting a continuous moment arm of substantially constant length, means for connecting the other end of said spring bar with said handle member, means for registering deflection of said spring bar to indicate force applied to the work including relatively movable elements, and means carried by said moment arm and adapted to cooperate with one of said relatively movable elements of said indicating means to operate the latter.

17. A torque measuring wrench which comprises, a handle member having a grip portion, a work-engaging member pivotally supported adjacent one end of said handle, the pivotal axis of said work-engaging member coinciding with the axis of rotation of the work, an arm member on said work-engaging member and extending longitudinally of said handle member, a spring bar extending from said arm longitudinally of said handle member and having one end connected to said arm and its other end engaged with said handle member, said arm and said spring bar providing a continuous constant moment arm of substantially constant length, whereby pressure applied to said grip portion is transmitted to the work through said handle member, thence through said spring bar and finally through said work-engaging member, and means for indicating the amount of pressure applied to the work by measuring the extent of relative rock movement between said handle member and said arm, said means comprising an operating part extending from said pressure indicating means and a second part on the work-engaging member cooperable with the first part to actuate said indicating means.

18. A torque measuring wrench comprising, a head member, a work-engaging member rockably supported thereby, a spring bar, means fixably connecting one end of said spring bar to one of said members, means on the other of said members pivotally supporting the other end of said spring bar and confining it against lateral displacement, and means for indicating the pressure applied to the work by registering the extent of relative rock movement of said head and said work-engaging members.

19. A torque measuring wrench adapted for use with means for indicating the force applied by the wrench to the work comprising a head member having provision for operably engaging it with the work, a handle member rockably connected to said head member, a spring bar carried by one of said members and so mounted that its end portions are retained against lateral displacement and its mid portion is free to flex, and means operably connecting the other of said members to said mid portion so that the spring member yieldably opposes relative rock movement between said head and handle members.

20. A torque measuring wrench adapted for use with means for indicating the force applied by the wrench to the work comprising a head member having provision for operably engaging it with the work, a handle member rockably connected to said head member, a spring bar supported wholly by one of said members, and abutment means carried by the other of said members and adapted to engage said spring bar intermediate its ends so that pressure applied to said spring bar by one member is transmitted through said spring bar to the work-engaging member and the work.

21. A torque measuring wrench adapted for use with means for indicating the force applied by the wrench to the work comprising a head member having provision for operably engaging it with the work, a handle member rockably connected to said head member, a spring bar carried wholly by said head member and having its opposite ends retained against lateral movement with its mid portion free to flex, and means for operably connecting said handle member to said mid portion so that said spring bar yieldably opposes relative rock movement between said head and handle members.

22. A torque measuring wrench adapted for use with means for indicating the force applied by the wrench to the work comprising a head member having top and bottom walls, a work-engaging member rotatably mounted in the top and bottom walls of said head member, a spring bar having one end secured to said work-engaging member, and a connection between the other end of said spring bar and said head member whereby said spring bar opposes relative movement of said members, said connection including a bar-supporting member having an opening therein in which the end of said spring bar is freely received, said head member having aligned openings in the top and bottom walls thereof with their axes extending substantially parallel with the axis of rotation of said work-engaging member, and a pair of oppositely extending bearing members on said supporting members and extending at substantially right angles to said bar-receiving opening, said bearing members being rotatably received in said head member openings.

23. A torque measuring wrench comprising a head member including a grip portion, a work-engaging member rockably connected thereto, an elongated normally straight spring bar having its active flexing part disposed wholly between said rockable connection and said grip portion, means rigidly connecting one end of said spring bar to said work-engaging member, means providing a longitudinally slidable connection between said spring bar and said head member, said connection confining said spring bar against movement in either direction relative to said head member and in a plane at right angles to the rock axis of said rockably connected members so that said work-engaging member can be utilized to tighten left or right hand threaded work pieces, and means indicating the amount of pressure applied to the work by measuring the extent of relative rock movement between said head and work-engaging members.

24. A torque measuring wrench comprising a head member, a work-engaging member rotatably mounted in said head member and having a part exteriorly accessible for connection with the work, a rigid arm on said work-engaging member and having a longitudinal opening of predetermined cross-sectional size and length extending from its outer end toward the axis of rotation of said work-engaging member, an elongated spring bar of substantially uniform cross section throughout its length having one end securely mounted in and extending substantially to the rear end of said arm opening, a second connection between the other end of said spring bar and said head member, and means for connecting said work-engaging member with a pressure indicating mechanism responsive to relative movement of said head and work-engaging members.

25. A torque measuring wrench comprising a head member, a work-engaging member rotatably mounted in said head member and having a part exteriorly accessible for connection with the work, a rigid arm integrally extending from said work-engaging member and having an opening of predetermined cross-sectional size and length in its outer end and extending toward the axis of rotation of said work-engaging member on a line passing through said axis at substantially right angles thereto, an elongated straight spring bar of substantially uniform cross section throughout having one end extending into said arm opening substantially the full length of the latter, a connection between the other end of said spring bar and said head member, whereby said spring bar yieldably opposes relative movement between said members, and pressure indicating mechanism for measuring the extent of relative movement between said members in terms of pressure applied to the work.

26. A torque measuring wrench comprising an elongated head member having top and bottom walls, said head member having aligned circular openings at the forward end thereof in said top and bottom walls, aligned circular openings at the rear end thereof in said top and bottom walls and an intermediate opening in said top wall, a work-engaging member having parts rotatably mounted in said forward openings, a spring bar connected at one end to said work-engaging member, a connection between the other end of said bar and said head member including a member having parts rotatably mounted in said rear openings, indicating mechanism having a part fitting in said intermediate opening, operating means carried by said part and extending into said head member, and means carried by said work-engaging member and adapted to be operably engaged with said operating means merely by axial insertion of said mechanism part in said intermediate opening.

27. A torque measuring wrench comprising a head member, a work-engaging member rotatably mounted in said head member and having a part exteriorly accessible for connection with the work, a rigid element on said work-engaging member and having a longitudinal opening of predetermined cross-sectional size and length extending from its outer end toward the axis of rotation of said work-engaging member, an elongated spring bar of substantially uniform cross section throughout its length having one end securely mounted in and extending substantially to the rear end of said element opening, a second connection between the other end of said spring bar and said head member, and means for connecting said work-engaging member with a pressure indicating mechanism responsive to relative movement of said head and work-engaging members.

28. A torque measuring wrench comprising a head member, a work-engaging member rotatably mounted with respect to said head member and having a portion provided with an opening, said opening extending in a direction transverse to the axis of rotation of said work-engaging member and lying across said axis, an elongated flexible spring bar having one end thereof securely mounted in said opening and having its opposite end connected to said head member for yieldably opposing relative rotary movement of said head member and work-engaging member, and indicating means operable by said work-engaging member as said head member and work-engaging member rotate relative to each other for indicating the force applied to the work through said members and spring bar.

29. A torque wrench comprising a body member, a head member rotatably carried by said body member, a torque resisting beam carried at one end by one of said members, means providing a pivotal connection between the other end of said beam and the other of said members, indicating means, and means for connecting one end portion of said beam with said indicating means.

30. A torque measuring wrench adapted to tighten work having right or left hand threads comprising, a head member, a work-engaging member rockably supported thereby, a spring bar, means fixably connecting one end of said spring bar to one of said members, means on the other of said members slidably receiving the other end of said spring bar and confining it against lateral displacement in opposite directions, and means for indicating the pressure applied to the work by registering the extent of relative rock movement of said head and said work-engaging members.

31. A wrench adapted to tighten work having right or left hand threads comprising, a head member, a work-engaging member rockably supported thereby, a spring bar, means fixably connecting one end portion of said spring bar to one of said members, abutment means on the other of said members engaging the other end portion of said spring bar and confining it against lateral displacement in opposite directions while permitting free relative longitudinal movement thereof, and means for indicating the force applied to the work by registering the extent of relative rock movement of said head and said work-engaging members.

32. A torque measuring wrench comprising, a handle member, a work-engaging member rockably supported thereby, an arm extending substantially radially from said work-engaging member, a spring bar, means fixably connecting one end of said spring bar to said arm, means on said handle member pivotally supporting the other end of said spring bar and confining it against lateral displacement, and means for indicating the pressure applied to the work by registering the extent of relative rock movement of said head and said work-engaging members.

33. A torque measuring wrench comprising, a handle member, a work-engaging member pivotally supported adjacent one end of said handle member, a normally straight spring bar yieldably opposing relative rock movement of said work-engaging member and said handle member, said spring bar having one end thereof fixedly mounted in said work-engaging member and extending across the axis of rotation of said work-engaging member and having its opposite end arranged to have a force applied thereto through said handle member, and means responsive to flexing of said spring bar and consequent relative rock movement of said work-engaging and handle members for indicating the force applied to the work.

34. A torque measuring wrench comprising, a handle member, a work-engaging member pivotally supported adjacent one end of said handle member, a normally straight spring bar yieldably opposing relative rock movement of said work-engaging member and said handle member, said spring bar having one end thereof fixedly mounted in said work-engaging member and extending across the axis of rotation of said work-engaging member and having its opposite end pivotally connected with said handle member, and means responsive to flexing of said spring bar and consequent relative rock movement of said work-engaging and handle members for indicating the force applied to the work.

35. A torque measuring wrench comprising, a handle member having a grip portion on one end thereof, a work-engaging member rockably supported by the other end of said handle member, a rigid work-engaging element rigidly connected to said work-engaging member to maintain a constant relationship between the axis of rotation of the work and the axis of rotation of said handle member relative to said work-engaging member, a normally straight spring bar member rigidly connected at one end to said work-engaging member and extending toward said grip portion so that its entire active flexing portion is disposed wholly between the axis of rotation of said work-engaging member and said grip portion in general longitudinal alignment with said work-engaging member and said grip portion, means operably connecting the other end of said spring bar member to said handle member so that pressure is applied to the work directly through said handle member, spring bar member, work-engaging member and work-engaging element in the order named, whereby the leverage between the work and said spring bar member is maintained constant, indicating means carried by one of said members and including relatively movable elements, and means for connecting one of said relatively movable elements of said indicating means to one of the other of said members whereby it is actuated to indicate pressure applied to said handle member and, in turn, the work through said grip portion without exerting through said indicating means the pressure applied to the work, the arrangement being such that said indicating means indicates pressure applied at all points within the flexing range of said spring bar member.

36. A torque measuring wrench adapted for use with means for indicating the force applied to the work which comprises a handle member having a grip portion, a work-engaging member having a portion pivotally supported adjacent one end of said handle, means coaxial with the axis of said pivotally supported portion by which said work-engaging member may be connected with the work, an arm member on said work-engaging member and extending longitudinally of said handle member, a normally straight, stiff spring bar extending from said arm longitudinally of said handle member in substantially radial relation to the axis of rotation of the pivoted portion of said work-engaging member and having one end connected to said arm and its other end engaged with said handle member at a predetermined distance from the axis of rotation of the pivoted portion of said work-engaging member and at a point between said grip portion and said axis, said arm and said spring bar providing a continuous constant moment arm of substantially constant length, whereby pressure applied to said grip portion is transmitted to the work through said handle member, thence through the spring bar and finally through said pivoted portion of said work-engaging member.

37. A torque measuring wrench adapted for use with means for indicating the force applied to the work which comprises, a handle member extending substantially throughout the length of the wrench and having a grip portion adjacent one end thereof, a work-engaging member having a portion pivotally supported adjacent the other end of said handle member and another portion located on the axis of the first portion and adapted for connection of the work-engaging member with the work, a normally straight spring bar disposed in end to end relation to said grip portion and the pivoted portion of said work-engaging member with its longitudinal axis extending substantially radially relative to the axis of the pivoted portion of said work-engaging member, said spring bar having one end fixedly mounted in said work-engaging member substantially at the pivotal axis thereof with its other end in slidable engagement with said handle member at a point between said axis of the pivoted portion of said work-engaging member and said grip portion and at a predetermined and substantially constant distance from the axis of the pivoted portion of said work-engaging member, whereby pressure applied to said grip portion is transmitted directly through said handle member, thence forwardly through said spring bar from one end thereof to the other, thence to the pivoted portion of said work-engaging member and to the work, through a constant moment arm effective to rotate the work notwithstanding the position at which pressure is applied to said grip portion.

38. A torque wrench comprising: a handle member including an elongated body member having a chamber extending throughout substantially the full length of the body member and a longitudinally extending grip portion carried by said body member; an indicator carried by said handle member, said indicator being located at a point between the ends of said chamber; a work-engaging member having an enlarged portion in said chamber and a relatively smaller portion extending from said enlarged portion to the exterior of said chamber and adapted to be operatively connected with the work; means connecting said enlarged portion of said work-engaging member to said handle member, whereby force applied to said handle member is transmitted to said work-engaging member through said connecting means, the enlarged portion of said work-engaging member being arranged so that it can turn relative to said handle member in proportion to the force applied to the work; an elongated arm means in said chamber, one end of said elongated arm means being fixedly secured to the enlarged portion of said work-engaging member and extending radially from said enlarged portion and lengthwise of said chamber toward said grip portion, the opposite end of said elongated arm means being free to move upon turning of said enlarged portion of said work-engaging member relative to said handle member; and means operatively connecting said free end of said elongated arm means to said indicator to actuate said indicator upon movement of said free end of said elongated arm means.

HERMAN W. ZIMMERMAN.